Patented July 1, 1947

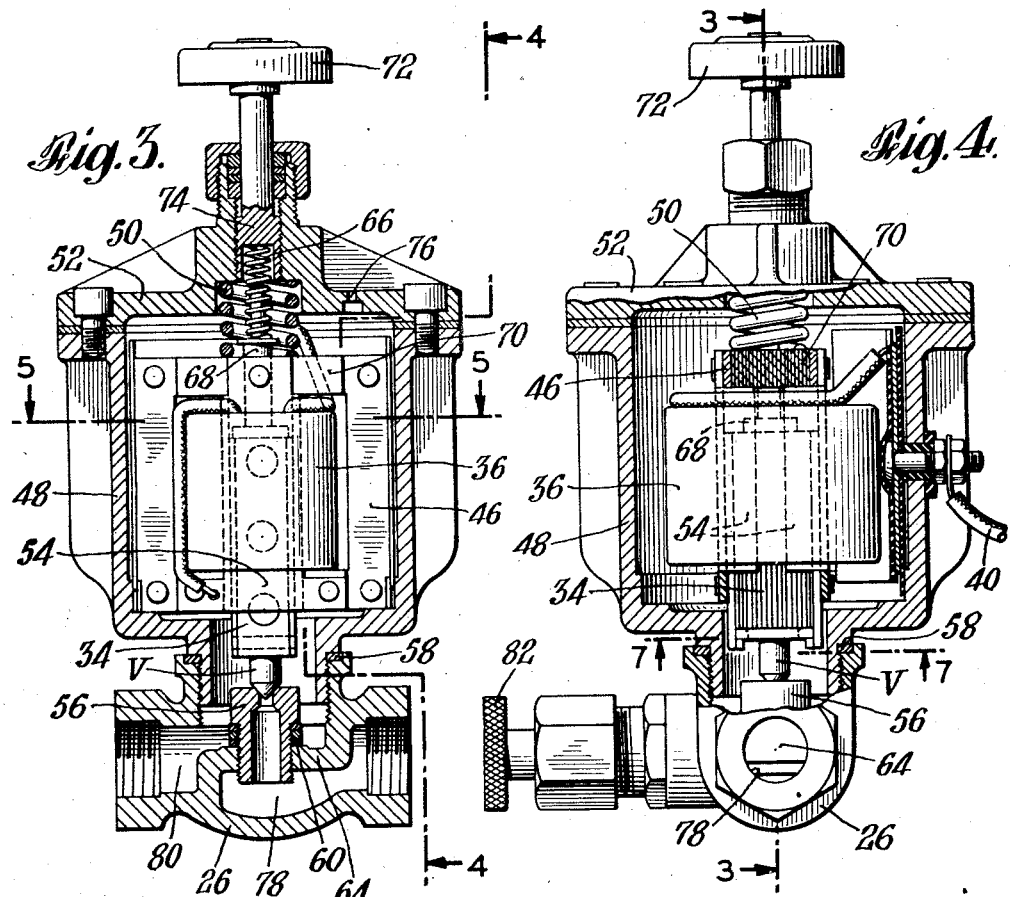

2,423,190

UNITED STATES PATENT OFFICE 2,423,190

ELECTROPNEUMATIC CONTROL SYSTEM

Harry E. Kennedy, Berkeley, Calif., assignor to The Linde Air Products Company, a corporation of Ohio Application August 15, 1944, Serial No. 549,512

11 Claims. (Cl. 219—8)

1

This invention relates to electro-pneumatic control systems, and more particularly to an improved system for automatically controlling the feeding of a welding electrode adapted to be fused and deposited upon a workpiece constituting a cooperative electrode.

The control system embodying the invention is particularly suitable for welding according to the process disclosed in Patent No. 2,043,960, dated June 9, 1936, wherein an electric welding current is passed from a fusible metal electrode, such as a bare steel rod or wire, through a granular inorganic welding medium to the metal work being welded. Such welding medium has a high electrical resistance when cold and is substantially free from substances that produce deleterious amounts of gas at welding temperatures when the medium becomes electrically conductive. As the welding operation proceeds along the work, the welding medium is supplied to the welding zone and the welding rod is continuously fed toward such zone to constantly maintain the fusing end of the welding rod under a blanket of the welding medium.

To produce strong welds of uniform quality, it is essential to heat the work evenly along the line of weld. In order to provide uniform welding heat in any type of electric welding in which a fusible electrode is fed toward the work in a moving welding zone, it is desirable to maintain the position of the fusing end of the electrode substantially constant with respect to the work. In the past this has been frequently accomplished by sensitive electronic circuits which can be built and serviced only by men who are skilled in electronic engineering. Since such men are scarce, and since automatic electronic control systems for electric welding apparatus need constant attention to function properly, there exists a need for an automatic electric welding control system that utilizes more readily available components which may be assembled by unskilled workmen, and kept in perfect operating condition by ordinary mechanics.

The main objects of this invention are to provide an improved automatic electric welding control system that is simple and economical in its parts, and may be built and serviced by ordinary workmen; an electro-pneumatic voltage regulator for maintaining a welding voltage substantially constant, the regulator being adjustable through a wide range to obtain a desired welding voltage, and also adjustable to obtain a desired maximum electrode feed; an automatic electric welding control system which is suitable

2 for either alternating current or direct current welding; automatic welding rod or electrode feed means that is inexpensive, reliable in operation, and free of electronic components such as vacuum tubes; automatic electric welding apparatus which is smooth in operation; an improved welding machine which may be used for lineal fillet welding or butt welding; and an electro-pneumatic regulator which is simple in construction and reliable in operation.

In the drawings:

Fig. 3 is an enlarged cross-sectional view taken on line 3—3 of Fig. 4, showing the electro-pneumatic apparatus;

Fig. 4 is a view partly in side elevation and partly in cross-section taken on line 4—4 of Fig. 3;

Fig. 5 is a view in section taken on line 5—5 of Fig. 3;

Fig. 6 is a view in side elevation of the assembly at the top portion of the armature; and Fig. 7 is a sectional view taken on line 7—7 of Fig. 4.

Figures 1, 2:
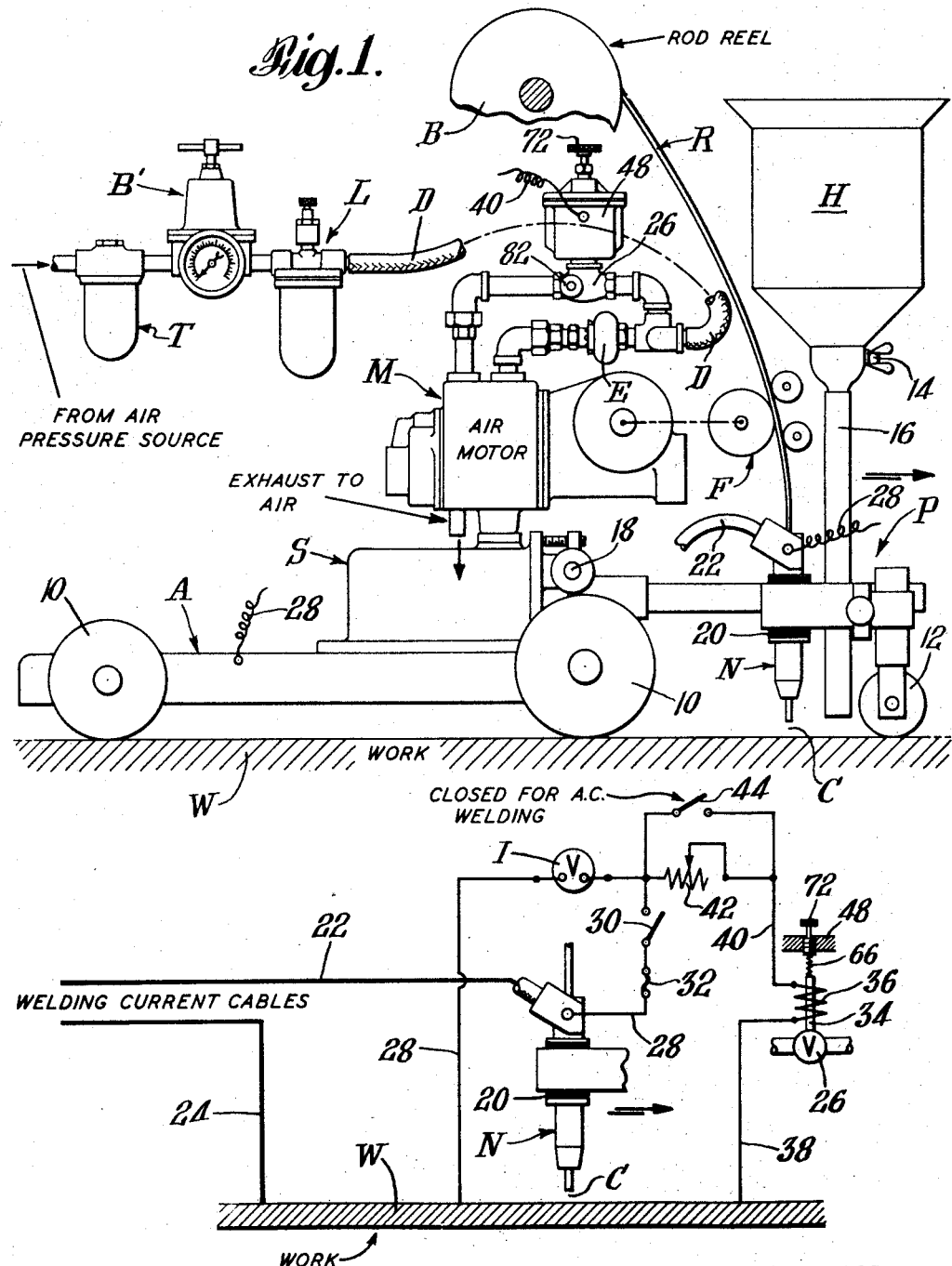
Fig. 1 is a fragmentary view in side elevation of an automatic welding machine exemplifying the invention.
Fig. 2 is a wiring diagram of the control system.

Referring to Figure 1 of the drawings, a welding carriage A is provided with wheels 10 which are adapted to move over work W to be welded. Mounted on the carriage A is a laterally adjustable and removable support S which carries a compressed air motor M and pilot assembly P. Also mounted on the support S is a rod feeding and guiding device F which is connected so as to be driven by the motor M. The motor may be used to drive one or more of the carriage wheels 10 over the work W, or a separate constant speed electric or compressed air motor may be used to drive the carriage.

The pilot assembly P includes a guide wheel 12 which is urged into contact with the work W by the rod feeding device F acting through welding rod R as the latter is fed through a nozzle N toward a welding zone which moves with respect to the work W as the carriage is driven thereover. The welding rod is supplied to the feeding device F from a rod supply reel B which is mounted on support S in such a way as to be tilted laterally, the rod feeding device F being also mounted to tilt laterally for fillet welding.

As the carriage A is moved with respect to the work W, the welding zone is covered with welding medium supplied through a flexible pipe 16 from a welding medium supply hopper H which is mounted on the carriage A, the amount of welding medium delivered to the welding zone being adjusted by a suitable valve 14 in the outlet of the hopper H. The arrangement is such that the pilot assembly P is free to float vertically about a horizontal axis 18 located at the front of the support S.

The rod nozzle N is carried by the pilot assembly P in a tubular electrical insulator 20, welding current being conducted to the upper portion of the nozzle N through a cable 22. As shown in Figure 2, another cable 24 is connected to the work W. Thus, when the machine is operating, a welding zone is established between the end of the welding rod R and the work W at C. This zone is normally covered in submerged melt welding with a welding medium under which the lower end of the welding rod R progressively fuses as the welding zone moves with the carriage A.

The compressed air motor M is driven by air under pressure supplied from any suitable compressed air source through a moisture trap T, a constant pressure regulator B', a lubricant injector L and a housing 26 containing a compressed air valve V, these components being connected in series in a suitable compressed air conduit D. The lubricant injector L is adapted to supply oil to the compressed air conduit at suitable intervals for lubricating the moving parts of the apparatus, especially the moving parts of the motor M. The constant pressure regulator B' is adjustable and is adapted to supply compressed air at a constant preselected pressure to the conduit D.

The compressed air motor is adapted to be driven in either direction by suitable means, including a reversing valve E, the arrangement being such that when the valve E is in one position the compressed air motor drives the carriage A in a forward direction, whereas when the valve E is moved to another position the compressed air motor drives the carriage in a backward direction.

As shown in Figure 2 the welding voltage is indicated by a voltmeter I which is connected in shunt circuit relation with the welding arc or zone C by suitable means including a conductor 28, a switch 30 and a safety fuse 32. The conductor 28 is connected to the work W through the carriage A which is grounded. Thus, when the switch 30 is closed the voltmeter I indicates the value of the welding voltage.

The compressed air supply valve V in the housing 26 is controlled by an armature 34 of a solenoid 36, the latter being connected by conductors 38 and 40 in shunt circuit relation with the welding arc or zone C, through the switch 30 and safety fuse 32. The conductor 40 is provided with a variable resistor 42 in series circuit relation with the solenoid 36, for direct current welding, the resistor being adapted to be short circuited by a shunt circuit including a switch 44 which is closed for alternating current welding. For direct current welding the switch 44 is opened. With this arrangement the same solenoid 36 may be energized by either alternating current or direct current.

Figs. 3–7 show the general construction of the novel valve and solenoid assembly of the invention. The solenoid or coil 36 and a laminated core 46 are held in position in a suitable housing 48 by a spring 50 which is compressed by a top cover 52. The laminated armature 34 slides in the center of coil 36 and is guided accurately and smoothly by brass strips 54. The valve or needle V is loosely attached to the armature 34 so that it can center itself accurately in an annular valve seat 56. Washers 58 and 60 are disposed between the solenoid housing 48 and a valve housing 26, and between the valve seat 56 and a partition 64 in the valve housing, respectively, to accurately adjust the maximum axial travel of the valve V. The needle V is biased against the valve seat 56 by the weight of the armature 34 and the force of a compression spring 66. The spring 66 acts through a movable non-magnetic pin 68 which extends through an opening in the top section 70 of the core 46 and rests on the top of the armature 34. The pin 68 also serves as an armature stop by engagement with the core section 70. The spring tension is adjusted by a knob 72 and screw 74 which is threaded to the top cover casing 52. The pin 68 stops down movement of the screw 70 at a safe point to prevent any damage to the spring 66. A pin hole 76 drilled through the top cover 52 of the housing 48 provides an air vent to cool the solenoid coil 36. The conical valve V points against the direction of air flow through the valve orifice from compressed air inlet chamber 78 to outlet chamber 80 in the valve housing 26 which is located in the conduit D. This, plus the size of the included angle of the cone, are essential to smooth operation of the system. The included angle of the cone is of the order of 90°.

The valve solenoid assembly involves an extremely critical balance of several forces and is constructed so that the various forces are in the correct relation. There are four forces acting on the armature—two tending to force it downward and two forcing it upward. The upward forces are the air pressure against the needle valve and the magnetic pull on the armature. The downward forces consist of the weight of the armature and the spring compression.

As the air pressure in the chamber containing the armature increases, it tends to balance the force of the air tending to lift the armature from the valve seat. This tendency of the air to equalize pressures similar to an oxygen regulator is very important for sensitive operation of the solenoid valve. If the valve armature were open to the atmosphere, it would have an entirely different action. The valve would function as a straight open and shut valve, since the air tending to open the valve would exert sufficient force after the armature has left the valve seat to cause an excess flow of air. Thus the action would tend to be irregular.

The forces are consequently in equilibrium at various positions of the valve. For example, when the downward forces equal the upward forces, the valve may be about $3/64''$ from the closed position. At this point about 20% of the maximum flow of compressed air will pass through the valve orifice. By backing up the adjusting screw about $\frac{1}{16}''$, the downward forces and upward forces balance with the valve at a position approximately $\frac{1}{16}''$ from the closed position, at which point the full volume or flow of air will pass through the valve opening or orifice. For successful operation the valve is constructed so that the downward forces change more rapidly than the upward forces as the valve opens. As the rate of change of the magnetic pull and air pressure approaches the rate of change of the spring force and armature weight, the variations in air flow become much greater in relation to the welding voltage variations, and when the rate of change of the upward forces exceeds the rate of change of the downward forces, the valve will open and close at a definite critical welding voltage.

The solenoid-valve assembly regulates the air flow through the valve orifice proportionally to the welding voltage applied to the solenoid coil. Most solenoid valves heretofore proposed are of the "on" and "off" type; that is, when the voltage applied to the coil reaches a certain value, the valve fully opens and remains open until the voltage is reduced to a certain value when it closes completely. Such valves are usually designed to operate on a particular fixed voltage such as 110 v., 220 v., or 440 v. Valves embodying the present invention, however, are constructed to operate on any voltage between 15 and 45 volts, for example, and may be adjusted to regulate the air flow in proportion to the applied voltage over any 10 volt range, for example, within the above voltage limits. That is the valve-solenoid assembly can be adjusted so that it just barely opens the needle valve when 20 volts are applied to the coil. If the voltage applied to the solenoid is of the order of 25 volts, approximately ½ the maximum air flow will pass through the valve orifice or opening, and at 30 volts the valve will be fully opened. When the voltage is within this range any slight increase or decrease of voltage will affect a corresponding change in air flow. Accurate voltage regulation is thus effected by the electro-pneumatic control system.

The valve housing 26 is provided with a normally closed by-pass valve 82 for "inching" the welding rod R into starting position.

In operation, the machine A is placed on the workpiece W to be welded, and in order to act as a fuse in initiating the welding action a ball of steel wool is inserted between the lower end of the welding rod or electrode R and the work in the zone C, or a high frequency mechanism may be used to initiate the welding action. The valve 14 is then opened so that the welding medium flows from the hopper H through the supply pipe 16, blanketing the welding zone C. Assuming that the conduit D is connected to a suitable source of compressed air, and that the constant pressure regulator B' is adjusted to deliver compressed air at a desired air pressure, the welding current cables 22 and 24 are connected to a suitable source of welding current. Then the switch 30 is closed to energize the electro-pneumatic control circuit. The welding operation thereupon starts automatically, the rod R being fed toward the work W and the moving welding zone C, under a blanket of welding medium which is supplied to the welding zone as the carriage C advances over the work. The electro-pneumatic control system automatically functions to maintain the welding voltage at a substantially constant preselected value, which voltage value depends upon the adjustment of the knob 72. When the welding operation is completed, the switch 30 is opened and the current discontinued.

While the invention is described and illustrated in connection with an automatic welding machine, it will be understood that the electro-pneumatic control system is essentially a voltage regulator of general utility. For example, the control system of the present invention may be employed to maintain constant the speed of an oxyacetylene cutting machine.

I claim:

1. An electro-pneumatic welding control system comprising, in combination, a rotary compressed air motor for feeding an electrode toward another electrode in a moving welding zone, means including an air supply throttle valve for feeding a variable amount of compressed air to said motor, and electromagnetic means responsive to a welding characteristic for controlling said air supply throttle valve, the system automatically acting to throttle the total amount of air supplied to said motor to maintain such characteristic substantially constant.

2. A welding voltage regulator comprising, in combination, a device for feeding a welding rod toward a moving workpiece in welding circuit relation with such rod, a coil connected to said rod and workpiece, an armature in said coil, the movement of said armature being responsive to the welding voltage, a rotary compressed-air motor arranged to drive said device, and means for supplying a variable amount of compressed air to said motor including an air supply throttle valve, said throttle valve being operatively connected to said armature, so that any change in the welding voltage is compensated by a change in the total amount of air supplied to the motor and the feeding rate of the rod which restores the welding voltage to a desired value.

3. In combination, a rotary air motor, and means for controlling the speed of said motor comprising a source of electrical energy having a characteristic which is responsive to such speed, a solenoid coupled to said source and energized in accordance with said characteristic, an armature actuated by said solenoid, the extent of movement of said armature being governed by the energization of said solenoid, a source of air under constant pressure, means including a throttle valve for supplying the total amount of air from said source to said motor, the speed of said motor being controlled by the total amount of air supplied to the motor by the opening of said throttle valve, and means connecting said throttle valve to said armature, so that the speed of said motor is automatically regulated to keep the value of such characteristic constant.

4. In combination, a pair of electrodes, a carriage for moving one electrode along a predetermined path with respect to the other electrode, one of said electrodes consisting of a rod composed of metal, a rod feed device for advancing said rod toward the other electrode during the movement of said carriage, means connecting a source of current across said electrodes for establishing an arm between the end of said rod and the other electrode, a rotary air motor connected to drive both said rod feed device and said carriage, means including a throttle valve for supplying the total amount of air to said motor, the speed of said motor being responsive to the total amount of air supplied to the motor by the opening of said valve, and means controlling the opening of said valve comprising a solenoid electrically connected in shunt circuit relation with said arc, and an armature responsive to the energization of said solenoid, said armature being mechanically connected to said valve, so that the speed of said motor is automatically regulated to maintain the voltage across such arc substantially constant.

5. A self-starting submerged-melt welding control system comprising, in combination, a welding rod feed device, a rotary compressed-air motor connected to drive said device, means for supplying compressed air to said motor including an air throttle valve which controls the total amount of air supplied to the motor, spring means biasing said air throttle valve toward closed position, electromagnetic means for overcoming said spring means and automatically regulating the opening of said air valve and the total supply of air to the motor so as to maintain a constant welding voltage between said rod and another electrode, means for adjusting said spring means to produce a desired welding voltage, and means for adjusting said air throttle valve to produce a desired maximum motor speed.

6. In a welding machine, the combination with a pair of electrodes consisting of a welding rod and a workpiece composed of metal, means acting to move one of said electrodes along a welding path with respect to the other, means for maintaining a welding arc between the end of said welding rod and workpiece, and a rod feed device for advancing the rod toward the workpiece, of a rotary compressed air motor arranged to drive said rod feed device, means including an air throttle valve connecting said motor to a constant pressure source of compressed air, and means controlling said air valve comprising a solenoid electrically connected to said electrodes in shunt with such welding arc, said solenoid having an armature mechanically connected to said valve, spring means biasing said armature and valve toward closed position, and means for adjusting said spring means to set the voltage of such arc.

7. Automatic means for feeding a welding rod toward a moving workpiece in welding circuit relation therewith so as to maintain a constant welding voltage between said rod and the workpiece, comprising, in combination, a rotary compressed air motor operative when energized to feed said rod toward said moving workpiece, means including an air throttle valve connecting said motor to a source of compressed air at constant pressure, and electromagnetic means responsive to said voltage for controlling the opening of said air valve and the total amount of air supplied to the motor to energize said motor so that the rod is fed toward the moving workpiece at a rate which maintains such voltage constant.

8. In an electro-pneumatic regulator comprising a rotary motor the speed of which is responsive to the total supply of compressed gas released by a gas throttle valve from a constant pressure source, and means driven by said motor for producing a characteristic the value of which should be substantially constant, the value of said characteristic being responsive to the speed of said motor; a coil energized in accordance with the value of said characteristic, a laminated iron core for said coil, a laminated iron armature in said coil, said armature being operatively connected to the gas throttle valve, spring means biasing said armature toward valve-closed position, means for adjusting the stroke of said valve, and means for adjusting the force of said spring, the arrangement being such that force of said spring determines the value of said characteristic, so that the regulator automatically functions smoothly to maintain such value substantially constant.

9. An electro-pneumatic voltage regulator including a solenoid, means energizing said solenoid in accordance with a voltage to be regulated, means including a needle throttle valve for regulating such voltage in response to gas flow through the valve, an armature operatively associated with said solenoid and gas valve means, including a spring and gravity biasing said armature in one direction, means including gas pressure against the valve and magnetic pull on the armature biasing said armature in the opposite direction, said biasing means and the shape of the valve being proportioned so that the valve is opened by said armature when a voltage above a predetermined minimum value is applied to said solenoid, and the armature thereupon regulates the gas flow through the valve proportionally to the voltage applied to the solenoid, with the result that the value of such voltage is kept substantially constant, and means for adjusting the force of said spring to obtain a selected voltage value.

10. An electro-pneumatic regulator for smoothly maintaining an otherwise variable characteristic substantially constant, said regulator comprising, in combination, a throttle valve controlling flow of compressed gas, a solenoid, means responsive to such gas flow for energizing said solenoid in accordance with the value of said characteristic, an armature operatively connected to said solenoid and valve, and a spring acting on said armature in opposition to the force of said solenoid, the arrangement being such that any slight change in the value of said characteristic is automatically compensated by the regulator, the gas flow through said valve being continuously proportional to the value of said characteristic without any interruption to such flow during the operation of the regulator.

11. In a cutting or welding machine, the combination of a compressed gas conduit containing a moisture trap, a constant pressure regulator, a lubricant injector, a throttle valve, and a motor in series, an electrode feeding device connected to be driven by said motor, a solenoid connected to be energized in accordance with the welding or cutting voltage, a spring biased armature in said solenoid, and means connecting said armature to said valve, so that said throttle valve is continuously held open by said armature during the operation of the machine and automatically maintains such voltage substantially constant by changing the total flow of gas to the motor in response to changes in such voltage.

HARRY E. KENNEDY.

REFERENCES CITED

The following references are of record in the file of this patent:

UNITED STATES PATENTS

| Number | Name | Date |
| --- | --- | --- |
| 1,895,699 | Ziska | Jan. 31, 1933 |
| 2,007,602 | Goodspeed | July 9, 1936 |
| 2,260,510 | Clapp | Oct. 28, 1941 |
| 2,000,571 | Oswald | May 7, 1935 |
| 1,892,917 | Walker | Jan. 3, 1933 |
| 1,892,956 | Kennedy | Jan. 3, 1933 |
| 2,114,961 | Gille | Apr. 19, 1938 |
| 2,308,285 | Jeffrey | Jan. 12, 1943 |
| 298,531 | White | May 13, 1884 |
| 839,186 | Noble | Dec. 25, 1906 |
| 991,152 | Hanchett | May 2, 1911 |
| 1,638,032 | Himmelsbach | Aug. 9, 1927 |
| 282,816 | White | Aug. 7, 1883 |